United States Patent [19]
Decker

[11] 3,904,398
[45] Sept. 9, 1975

[54] MANUFACTURING PIG IRON IN A BLAST FURNACE

[75] Inventor: Alfred Decker, Embourg, Belgium

[73] Assignee: Centre de Recherches Metallurgiques - Centrum voor Research in de Metallurgie, Brussels, Belgium

[22] Filed: Aug. 22, 1973

[21] Appl. No.: 390,382

[30] Foreign Application Priority Data
Aug. 22, 1972 Belgium .............................. 787866

[52] U.S. Cl. .................................................. 75/42
[51] Int. Cl.² ......................................... C21B 5/00
[58] Field of Search ................................... 75/41, 42

[56] References Cited
UNITED STATES PATENTS

| | | | |
|---|---|---|---|
| 1,917,642 | 7/1933 | Furnas | 75/41 |
| 2,799,576 | 7/1957 | Gumz et al. | 75/41 |
| 2,952,533 | 9/1960 | Cuscoleca et al. | 75/42 X |
| 3,062,640 | 11/1962 | Agarwal et al. | 75/41 X |
| 3,210,181 | 10/1965 | Manny | 75/41 |
| 3,764,299 | 10/1973 | Wenzel | 75/42 |
| 3,814,404 | 6/1974 | Claflin | 75/42 |

Primary Examiner—L. Dewayne Rutledge
Assistant Examiner—M. J. Andrews
Attorney, Agent, or Firm—Holman & Stern

[57] ABSTRACT

Hot reducing gas is injected into the burden above the zone of fusion or above the zone of softening of the burden. The gas is introduced at a temperature below that prevailing in the furnace at the place where injection occurs.

9 Claims, 1 Drawing Figure

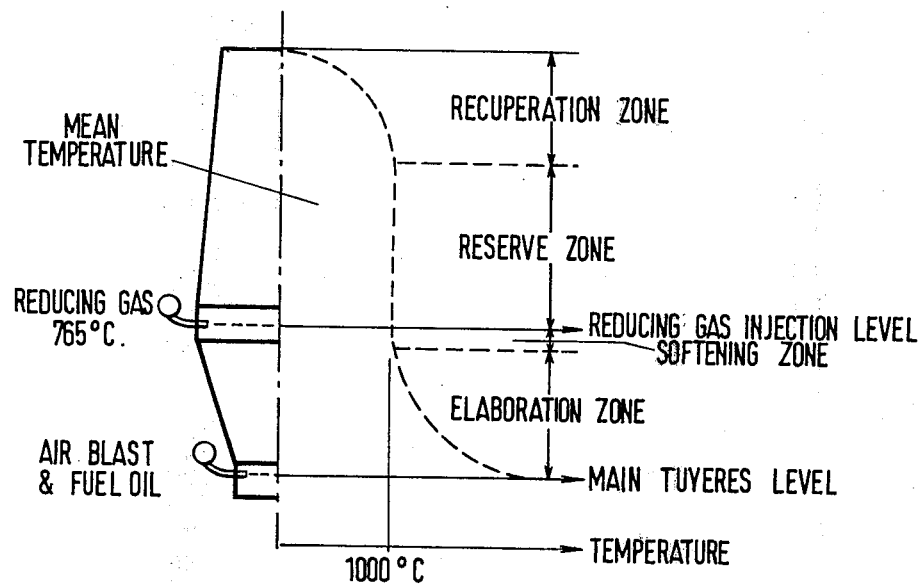

MANUFACTURING PIG IRON IN A BLAST FURNACE

The present invention relates to a process for manufacturing pig iron in a blast furnace in which at least part of the reduction agents is supplied in the form of a reducing gas injected into the burden.

As is known, the proposal to carry out such an injection is not novel. Its main object is to reduce the coke consumption of the blast furnace, which, from an economic point of view, constitutes a particularly interesting advantage because of the increasing scarcity and high price of metallurgical coke.

The reducing gases which are injected are principally constituted of CO and $H_2$ which are easily and economically obtained, for example by partial oxidation of hydrocarbons such as natural gas or fuel oil.

The maximum efficacy of the reducing gas, obtained by one or other of the methods, is achieved when the gas is injected above the zone of fusion of the burden, preferably above the zone of softening.

One of the problems which is to be solved is to determine the optimum temperature of the reducing gas which is to be injected. Up until now it has been assumed by specialists that the temperature should be equal to or higher than that prevailing in the blast furnace at the place where the injection takes place. It was thought that such a temperature was necessary to avoid local cooling of the blast furnace with all the consequences which could result from this. Injection at a temperature equal to or greater than that prevailing in the place where the gas is supplied was recommended all the more because, generally speaking, the overall reaction of the reducing gas with the solid and gaseous components of the burden is endothermic.

The present invention is based on the completely surprising discovery that the physical and economic operation of the blast furnace is favorably influenced if the reducing gas is injected into the furnace at a temperature lower than that prevailing in the burden at the point where injection takes place.

Accordingly, the invention provides a process for manufacturing pig iron in a blast furnace in which hot reducing gas (composed principally of $H_2$ and/or CO) is injected into the burden above the zone of fusion of the burden, and preferably above the zone of softening, the reducing gas being introduced into the furnace at a temperature below that prevailing in the furnace at the place where injection occurs.

Clearly it is not possible to lower the temperature of the gas to a level which will involve the risk of disturbing the physical operation of the furnace. At the moment, it does seem possible to descend below a temperature of 400°C if the volume of gas injected per ton of pig iron is significant (for example, exceeding 900 $Nm^3$/t pig iron) and/or if the endothermicity of the mixture is significant and/or if the $H_2O$ and/or $CO_2$ content of the gas is above a critical level (for example 3%).

In one advantageous mode of operation the hot reducing gas is injected at a temperature which is at least 100°C lower than the temperature of either the rising gases or, preferably, the solid materials, in the furnace at the level of injection. Thus, particularly interesting results have been obtained by injecting the reducing gas at a temperature lower than 800°C in the zone of the furnace where the temperature of the materials is higher than 900°C.

It is advantageous for the hot reducing gas to be injected in such conditions that the temperature of the throat gas of the furnace is between the dewpoint and 300°C, and preferably between the dewpoint and 150°C.

Another problem consists in determining the optimum level of injection which corresponds physically and chemically to that where the reduction reactions take place with the maximum speed possible without consuming coke from the burden.

It has been found — and this is another important feature of the present invention — that the hot reducing gas is advantageously injected at such a level that the gas travels a distance of at least 10 m in the furnace before reaching the upper surface of the burden.

The level at which the hot reducing gas is injected into the blast furnace is preferably situated in the lower part of the furnace, that is to say into the upper zone of the bosh, into the "belly," or in the bottom of the shaft, for example, in a modern furnace between 3 and 6 m above the level of the main tuyeres.

In fact, the optimum injection level depends on the thermal profile of the furnace and as this thermal profile varies in the course of time it would thus be necessary to continuously change this level of injection. This is clearly impracticable because the restrictions imposed by mechanical design mean that this level must be fixed. It is thus of interest to use a system for measuring the temperature at the level of injection so as to be able to vary the injection temperature of the reducing gas in accordance to variations in the thermal profile of the furnace. An advantageous way of carrying out the process is to lower the temperature of the reducing gas whenever the temperature in the injection zone increases.

Another way of controlling the process is to control the temperature of the reducing gas as a function of the temperature of the throat gas within previously fixed limits, this control being carried out either manually or automatically.

Finally, a last problem relates to the volume of reducing gases injected. From this point of view it has been found advantageous to execute an injection such that the volume of reducing gas injected (for example $H_2$ or CO) is comprised between 100 and 900 $Nm^3$/ton pig iron.

It does not exceed the scope of the present invention to combine the injection of the hot reducing gas referred to above with an injection of auxiliary hydrocarbonaceous fuels at the level of or through the main blast tuyeres, optionally with oxygen enrichment of the blast.

EXAMPLE

The accompanying drawing schematically shows the injection of hot reducing gas into a blast furnace with a diameter of 4.50 m.

A gas containing 71% $H_2$ and 17% CO, the balance being $CO_2$ + $CH_4$ + $N_2$ + $H_2O$, was injected at a level situated 3.40 m above that of the main tuyeres at a rate of 400 $Nm^3$ per ton of pig iron. At the same time fuel oil was injected through the main tuyeres at the rate of 75 kg/ton pig iron.

The temperature of the furnace at the gas injection level was approximately 1,000°C.

The temperature of the reducing gas measured at the moment of its injection into the furnace, was 765°C.

The rate at which the injected reducing gas was used up has proved to be very satisfactory and close to the values theoretically calculated under ideal operating conditions. In addition, a notable reduction in the coke rate of the order of 200 kg/ton pig iron was observed, together with an increase in the productivity of the furnace, which increase did not, however, result in the slightest irregularity of operation.

I claim:

1. In the process of manufacturing pig iron in a blast furnace, comprising charging the furnace with a burden of iron ore and solid carbonaceous material, the burden descending in the furnace through a softening zone and a fusion zone, and injecting hot reducing gas into the burden above the fusion zone: the improvement comprising measuring the temperature of throat gas yielded by the furnace; and controlling the temperature of said hot reducing gas as a function of said throat gas temperature by decreasing said reducing gas temperature when said throat gas temperature increases and by increasing said reducing gas temperature when said throat gas temperature decreases, whereby the throat gas temperature is kept between the dewpoint of the throat gas and 300°C., the hot reducing gas temperature being below that prevailing in the furnace at the place where injection occurs.

2. The process of claim 1, wherein said hot reducing gas is injected at a temperature at least 100°C lower than the temperature of the gases rising through the burden at the place where injection occurs.

3. The process of claim 1, wherein said hot reducing gas is injected at a temperature at least 100°C lower than the temperature of the solid materials in the furnace at the place where injection occurs.

4. The process of claim 1, wherein said reducing gas is injected at a temperature below 800°C into a zone of the furnace where the temperature of the burden is higher than 900°C.

5. The process of claim 1, wherein said hot reducing gas is injected into the lower part of the furnace.

6. The process of claim 1, wherein the volume of said hot reducing gas injected is between 100 and 900 Nm³ per ton of pig iron.

7. The process of claim 1, further comprising injecting hydrocarbonaceous fuel into the furnace at the level of the tuyeres supplying the blast, simultaneously with the injection of said hot reducing gas.

8. The process of claim 1, wherein the hot reducing gas temperature is above 400°C.

9. The process of claim 1, wherein the throat gas temperature is kept between the dewpoint of the throat gas and 150°C.

* * * * *